(12) United States Patent
Chopra et al.

(10) Patent No.: US 11,644,334 B2
(45) Date of Patent: May 9, 2023

(54) ROUTE OPTIMIZATION SYSTEM BASED ON HEIGHT PARAMETER

(71) Applicant: Uber Technologies, Inc., San Francisco, CA (US)

(72) Inventors: Danish Chopra, Sunnyvale, CA (US); Karapet Shaginyan, San Francisco, CA (US); Seth Alan Woolley, Portland, OR (US); Kapil Gupta, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 1100 days.

(21) Appl. No.: 16/270,040

(22) Filed: Feb. 7, 2019

(65) Prior Publication Data

US 2020/0256696 A1   Aug. 13, 2020

(51) Int. Cl.
*G01C 21/34* (2006.01)
*G01C 21/36* (2006.01)
*G06N 20/00* (2019.01)

(52) U.S. Cl.
CPC ..... *G01C 21/3682* (2013.01); *G01C 21/3438* (2013.01); *G01C 21/3476* (2013.01); *G01C 21/3661* (2013.01); *G06N 20/00* (2019.01)

(58) Field of Classification Search
CPC ........... G01C 21/3682; G01C 21/3438; G01C 21/3476; G01C 21/3661; G06N 20/00
USPC ........................................ 701/420
See application file for complete search history.

(56) References Cited

U.S. PATENT DOCUMENTS

| | | | | |
|---|---|---|---|---|
| 6,856,897 | B1 * | 2/2005 | Phuyal | G06T 17/05 701/461 |
| 7,035,733 | B1 * | 4/2006 | Alwar | G01C 21/26 340/995.18 |
| 8,723,698 | B2 * | 5/2014 | Davidson | G08G 1/137 340/995.25 |
| 8,731,832 | B1 * | 5/2014 | Davidson | G01C 21/34 340/932.2 |
| 10,167,645 | B2 * | 1/2019 | Geiger | E04B 1/34807 |
| 10,424,202 | B1 * | 9/2019 | Beaurepaire | G08G 1/144 |
| 10,490,073 | B2 * | 11/2019 | Nordbruch | G01S 5/02 |
| 10,535,270 | B2 * | 1/2020 | Lee | G01C 5/06 |

(Continued)

*Primary Examiner* — Richard A Goldman
(74) *Attorney, Agent, or Firm* — Schwegman Lundberg & Woessner, P.A.

(57) ABSTRACT

Systems and methods for managing routing involving an indicated point of interest associated with a plurality of levels of a multilevel (overlapping or stacked) roadway are provided. In example embodiments, a networked system aggregates trip data received from user devices that includes location information and detected attributes for points of interest. The networked system analyzes the location information and the detected attributes to determine a height parameter and, in some cases, a characteristic associated with different levels of the multilevel roadway for points of interest. The height parameters and characteristics for each point of interest are stored to a database in a data storage. During runtime, the networked system receives a request that includes a point of interest. In response, the networked system detects a level of roadway at the point of interest using the database and real-time device data. Based on the detected level of the multilevel roadway, a route is generated and presented.

20 Claims, 7 Drawing Sheets

(56) References Cited

U.S. PATENT DOCUMENTS

| | | | |
|---|---|---|---|
| 10,572,130 B2* | 2/2020 | Kim | G06F 3/04847 |
| 11,350,852 B2* | 6/2022 | Bhimavarapu | A61B 5/0017 |
| 2003/0062463 A1* | 4/2003 | Narita | G01Q 60/22 |
| | | | 250/201.3 |
| 2008/0128508 A1* | 6/2008 | Tsikos | G06K 7/10732 |
| | | | 235/462.42 |
| 2009/0043490 A1* | 2/2009 | Jung | G01S 19/14 |
| | | | 701/533 |
| 2009/0286556 A1* | 11/2009 | Yumoto | G01C 21/20 |
| | | | 455/456.6 |
| 2010/0082248 A1* | 4/2010 | Dorum | G06T 15/20 |
| | | | 701/533 |
| 2011/0172909 A1* | 7/2011 | Kahn | G01C 21/165 |
| | | | 701/533 |
| 2011/0238291 A1* | 9/2011 | Bach | G01C 21/32 |
| | | | 707/769 |
| 2012/0135745 A1* | 5/2012 | Kaplan | G01C 21/3848 |
| | | | 455/456.1 |
| 2014/0114567 A1* | 4/2014 | Buchanan | G01C 21/005 |
| | | | 701/454 |
| 2014/0309924 A1* | 10/2014 | Varoglu | G01C 21/206 |
| | | | 701/457 |
| 2015/0057926 A1* | 2/2015 | Gupta | G01C 21/14 |
| | | | 701/500 |
| 2015/0142253 A1* | 5/2015 | Nolting | G06Q 10/20 |
| | | | 701/29.6 |
| 2015/0241230 A1* | 8/2015 | Davidson | G06V 20/58 |
| | | | 701/533 |
| 2016/0187143 A1* | 6/2016 | Colby | G01C 21/20 |
| | | | 701/532 |
| 2016/0215753 A1* | 7/2016 | Westmoreland | F03B 17/04 |
| 2016/0377439 A1* | 12/2016 | Dorum | G01C 21/32 |
| | | | 701/409 |
| 2017/0176601 A1* | 6/2017 | Nara | G01S 19/45 |
| 2017/0217681 A1* | 8/2017 | Tai | B65G 1/0457 |
| 2018/0275277 A1* | 9/2018 | Li | G01S 17/89 |
| 2018/0281815 A1* | 10/2018 | Stentz | G01C 21/3438 |
| 2019/0057599 A1* | 2/2019 | Neumayer | H04W 4/02 |
| 2019/0212737 A1* | 7/2019 | Sonalker | G05D 1/0088 |
| 2019/0258265 A1* | 8/2019 | Wiacker | G08G 1/096725 |
| 2020/0033911 A1* | 1/2020 | Moser | G06F 1/162 |
| 2020/0143710 A1* | 5/2020 | Zhou | G06F 16/29 |
| 2020/0160712 A1* | 5/2020 | Beaurepaire | G08G 1/148 |
| 2020/0191576 A1* | 6/2020 | Zhang | G01C 21/3446 |
| 2020/0191591 A1* | 6/2020 | Zhang | G08G 1/0129 |
| 2020/0201354 A1* | 6/2020 | Beaurepaire | G08G 1/147 |
| 2020/0256696 A1* | 8/2020 | Chopra | G01C 21/3453 |
| 2020/0257317 A1* | 8/2020 | Musk | G05D 1/0044 |
| 2020/0363217 A1* | 11/2020 | Zhang | G01C 21/32 |
| 2020/0363231 A1* | 11/2020 | Pandey | G01C 21/3614 |
| 2021/0195112 A1* | 6/2021 | Verghese | G01S 17/89 |
| 2021/0261331 A1* | 8/2021 | Otto | B65G 1/0492 |
| 2021/0285187 A1* | 9/2021 | Jagoda | E02F 9/265 |
| 2022/0170760 A1* | 6/2022 | Bennati | G01C 21/30 |

* cited by examiner

ROUTE OPTIMIZATION SYSTEM BASED ON HEIGHT PARAMETER

TECHNICAL FIELD

The subject matter disclosed herein generally relates to special-purpose machines configured for providing routing information, and to the technologies by which such special-purpose machines become improved compared to other machines that provide routing information. Specifically, the present disclosure addresses systems and methods that uses detected attributes to determine height parameters for different levels of roadway that are used in generating optimized routes.

BACKGROUND

Conventionally, navigation systems provide a navigable route from a starting point to an end point. However, these conventional navigation systems do not take into consideration roadways that overlap or are stacked (e.g., overpasses; different levels of a parking structure or airport). When overlapping roadways are not distinguishable, the navigation system may provide routes that are incorrect. For example, a driver may be on a lower level going in one direction, but the navigation system assumes the driver is on an upper level going in an opposite direction. This deficiency can cause issues such as, for example, selecting a service provider that is farther away from a requester in a ride share embodiment, routing a vehicle to a wrong side of a roadway, or charging a toll when the driver is on a different level of roadway not requiring a toll (e.g., bottom roadway of bridge when there is only a toll on a top roadway).

BRIEF DESCRIPTION OF THE DRAWINGS

Some embodiments are illustrated by way of example and not limitation in the figures of the accompanying drawings.

DETAILED DESCRIPTION

Figure 1:
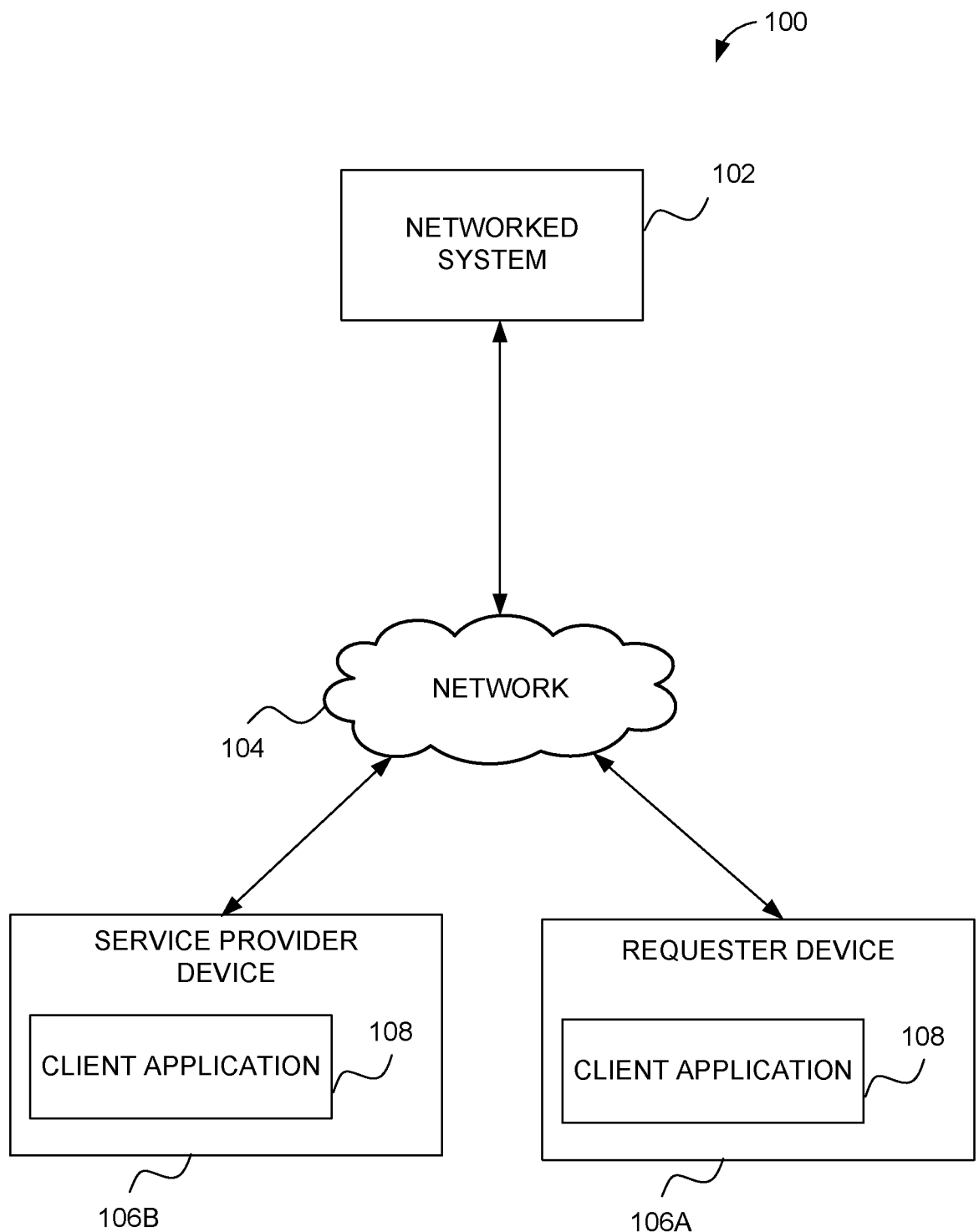
FIG. 1 is a diagram illustrating a network environment suitable for optimizing a route based on height parameters of segments of roadway, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for optimizing routing based on height parameters derived for segments of roadways. The derived height parameters allow a networked system to distinguish between different levels of roadway that overlap or are stacked at a point of interest. Specifically, example embodiments use user generated data and trip data to generate and maintain a parameter database that includes height parameters and associated characteristics (e.g., edge geometry, headings) for the segments of roadway at points of interest having stacked or overlapping roadways. The height parameters and associated characteristics are then used to generate optimized routes (e.g., for pick-up, to navigate to a destination). In some embodiments, the optimized routes are used to determine a service provider satisfying a predetermined threshold (e.g., shortest distance or estimated time of arrival to a user) to provide a transportation service, direct a user to a correct pick up location, or calculate costs for routes which may include tolls.

In example embodiments, a networked system aggregates trip data received from user devices over time, whereby the trip data includes location information and at least one attribute detected for each point of interest (POI). The attribute can include, for example, an altitude reading, a pressure reading (e.g., barometric pressure), or a Z-level associated with a point of interest. In example embodiments, the Z-level indicates a known level/floor for a particular point of interest. For example, a pickup location can be on the $3^{rd}$ floor of a parking garage (e.g., indicated by a requester for pick up). In this case, the Z-level would be the $3^{rd}$ floor (or 3).

The networked system then analyzes the trip data. Specifically, the networked system analyzes the location information and the attribute to determine a height parameter and, in some cases, a characteristic associated with different levels at the points of interest. In various embodiments, the characteristic comprises, for example, edge geometry of a segment of roadway or a heading for a segment of roadway. The height parameters and characteristics for the different levels at the points of interest are stored to a parameter database in a data storage.

During runtime, the networked system receives, from a device of a user, a request that include a point of interest having multiple levels (e.g., airport, shopping mall). In response to receiving the request, the networked system detects a level of roadway at the point of interest and, in some cases, at the user's location. Using the detected level of roadway, a route is generated and presented on a user interface on the device of the user (e.g., a rider or a service provider/driver).

Thus, example methods (e.g., algorithms) and example systems (e.g., special-purpose machines) are configured to improve a navigation process by building and maintaining a parameter database for points of interests, which in turn provides height parameters for segments of roadway at the points of interest, and use the height parameters, during runtime, to generate routes that take the different levels of roadway into consideration. Therefore, one or more of the methodologies described herein facilitate solving the technical problem of providing optimized navigation guidance that accounts for different levels of roadways (e.g., segments of roadways that overlap or are stacked on top of each other).

FIG. 1 is a diagram illustrating a network environment 100 suitable for optimizing routing based on height parameters and characteristics associated with points of interest that account for different levels of roadway. The network environment 100 includes a networked system 102 communicatively coupled via a network 104 to a requester device 106a and a service provider device 106b (collectively referred to as "user devices 106"). In example embodiments, the networked system 102 comprises components that obtain, store, and analyze data received from the user devices 106 and other sources in order to machine-learn (or derive) height parameters and characteristics for different levels of roadway at points of interest and to use the height parameter and characteristics to determine, for example, routes, pick-up and drop off locations, and service providers for a transportation service. The components of the networked system 102 are described in more detail in connection with FIG. 2 to FIG. 4 and may be implemented in a computer system, as described below with respect to FIG. 8.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 are portable electronic devices such as smartphones, tablet devices, wearable computing devices (e.g., smartwatches), or similar devices. Alternatively, the service provider device 106b can correspond to an on-board computing system of a vehicle. The user devices 106 each comprises one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 interact with the networked system 102 through a client application 108 stored thereon. The client application 108 of the user devices 106 allow for exchange of information with the networked system 102 via user interfaces as well as in background. For example, the client application 108 running on the user devices 106 may determine and/or provide location information of the user devices 106 (e.g., current location in latitude and longitude) to the networked system 102, via the network 104, for storage and analysis. In example embodiments, the location information is used by the networked system 102 to determine parameters (e.g., an altitude, a level associated with a structure (e.g., parking garage, airport), or a heading for segments of roadway). The location information, along with other data received from the user devices 106, can also be used to determine other data useful for generating routes such as, for example, information on a side of a roadway (e.g., street) a point of interest (POI) is located or geometry of edges of the segments of roadway (e.g., cloverleaf roadway).

In example embodiments, a first user (e.g., a requester) operates the requester device 106a that executes the client application 108 to communicate with the networked system 102 to make a request for a transportation service such as transport or delivery service (referred to collectively as a "trip") or to find a rentable vehicle (e.g., a bicycle or scooter). In some embodiments, the client application 108 determines or allows the user to specify a pick-up location (e.g., of the user or an item to be delivered) and to specify a drop-off location for the trip. The client application 108 also presents information, from the networked system 102 via user interfaces, to the user of the requester device 106a. For instance, the user interface can display a request from the networked system 102 to confirm a pick-up level (e.g., departure level at airport, arrival level at airport; floor of parking garage), confirm a location (e.g., door number of exit from baggage claim), confirm a side of a segment of roadway to be pick-up on, or confirm an address. The pick-up level can be stored as a height parameter for the pick-up location, while the location, side of the segment of roadway, and address can be stored as characteristics associated with segments of the roadway.

A second user (e.g., a service provider) operates the service provider device 106b to execute the client application 108 that communicates with the networked system 102 to exchange information associated with providing transportation service (e.g., to the user of the requester device 106a). The client application 108 presents information via user interfaces to the user of the service provider device 106b, such as invitations to provide the transportation service, navigation instructions, and pickup and drop-off locations of people or items. The client application 108 also provides data to the networked system 102 such as a current location (e.g., coordinates such as latitude and longitude) of the service provider device 106b, altitude readings detected by a sensor at the service provider device 106b, pressure reading (e.g., barometric pressure) detected by a pressure sensor on the service provider device 106b, or heading.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 may be embodied within the network environment 100. Furthermore, some components or functions of the network environment 100 may be combined or located elsewhere in the network environment 100. For example, some of the functions of the networked system 102 may be embodied within other systems or devices of the network environment 100. Additionally, some of the functions of the user device 106 may be embodied within the networked system 102. While only a single networked system 102 is shown, alternative embodiments may contemplate having more than one networked system 102 to perform server operations discussed herein for the networked system 102.

Figure 2:
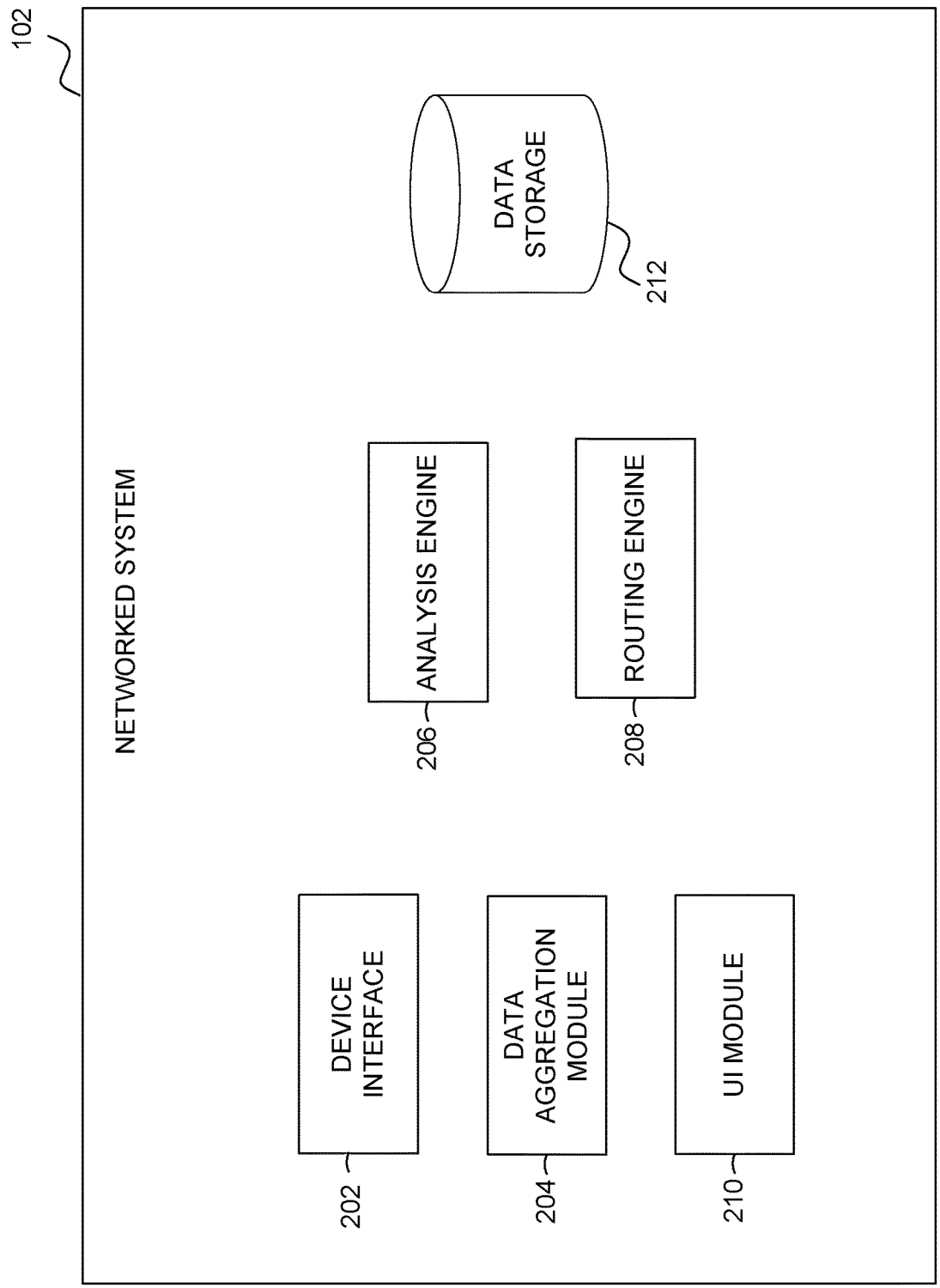
FIG. 2 is a block diagram illustrating components of a networked system for optimizing the route based on height parameters of segments of the roadway, according to some example embodiments.

FIG. 2 is a block diagram illustrating components of the networked system 102, according to some example embodiments. In various embodiments, the networked system 102 obtains and stores trip data (e.g., pick-up and drop-off locations, route, locations of user devices, pressure information) received from the user devices 106, analyzes the trip data to determine height parameters and characteristics for points of interest and corresponding levels/segments of roadway (e.g., height data, edge geometer, heading), and uses the analysis to optimize routing during runtime. To enable these operations, the networked system 102 comprises a device interface 202, a data aggregation module 204, an analysis engine 206, a routing engine 208, user interface (UI) module 210, and a data storage 212 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the user devices 106 and cause presentation of one or more user interfaces generated by the UI module 210 on the user devices 106 including user interfaces that request attribute information or request confirmation of the attribute information for a point of interest. In one example, the requested attribute information comprises an indication of a level of a roadway or structure (e.g., floor of a parking garage or airport), an exit location (e.g., door #2 of baggage claim), a side of the roadway or street, or an address. In some embodiments, the device interface 202 generates and transmits instructions (or the user interfaces themselves) to the user devices 106 to cause the user interfaces to be displayed on the user devices 106. The user interfaces can also be used to request transportation service from the requester device 106a, display invitations to provide the transportation service on the service provider device 106b, present navigation instructions including maps, and provide notifications. At least some of the information received from the user devices 106 are stored to the data storage 212, for example, as trip data.

The data aggregation module 204 is configured to aggregate trip data received from the user devices 106. The trip data can include location information (e.g., latitude and longitude), indicated attributes (e.g., height parameters such as a level (e.g., Z-level) indicated by a user), and detected attributes (e.g., altitude reading, pressure reading, heading), time for each trip, and cost for the transportation service. The trip data is stored to the data storage 212 by the data aggregation module 204.

The analysis engine 206 is configured to analyze trip data, and in particular, detected attributes, to determine height parameters and characteristics (e.g., heading, edge geometry) for different levels of roadway at the points of interest. Backend processing by the analysis engine 206 can occur at any time, at predetermined times or intervals (e.g., every night, once a week), when a predetermined amount of trip data has been stored, or based on other factors. In contrast, runtime analysis by the analysis engine 206 occurs in real-time in response to a request. The analysis engine 206 will be discussed in more detail in connection with FIG. 3 below.

The routing engine 208 manages generation and monitoring of routes between a pick-up location and a drop off location or a route to a pick-up location. In particular, the routing engine 208 uses the height parameters and characteristics associated with the different levels of roadway at points of interest, as well as current locations (and attributes) of users to determine one or more optimal routes to a pick-up location or between a pick-up location and a drop off location. The routing engine 208 may also use the height parameters and characteristics to determine an optimal service provider to provide transportation service or to calculate a cost for the transportation service and determine whether to include toll charges. The routing engine 208 will be discussed in more detail in connection with FIG. 4 below.

The user interface (UI) module 210 manages generation of user interfaces that are presented, via the client application 108, at the user device 106. The user interfaces can be used to request transportation service from the requester device 106a, display invitations to provide the service on the service provider device 106b, present navigation instructions and maps, and provide or confirm attributes for points of interests.

The data storage 212 is configured to store information associated with each user of the networked system 102. The information includes various trip data used by the networked system 102 to machine-learn or derive height parameters and characteristics for segments of roadways at the points of interest. In some embodiments, the data is stored in or associated with a user profile corresponding to each user and includes a history of interactions using the networked system 102. While the data storage 212 is shown to be embodied within the networked system, alternative embodiments can locate the data storage 212 elsewhere and have the networked system 102 communicatively coupled to the data storage 212.

Figure 3:
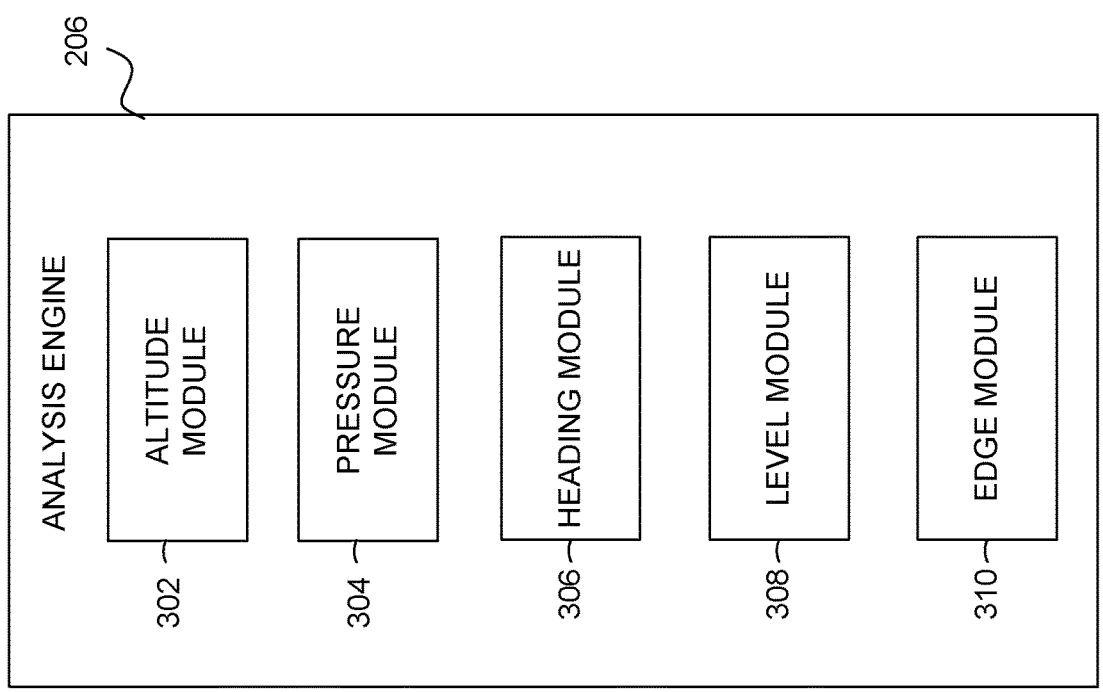
FIG. 3 is a block diagram illustrating components of an analysis engine, according to some example embodiments.

FIG. 3 is a block diagram illustrating components of the analysis engine 206, according to some example embodiments. In example embodiments, the analysis engine 206 is configured to analyze the trip data to determine height parameters (e.g., altitude, levels) and characteristics (e.g., heading, edge geometry) associated with different levels of segments of roadways at points of interest. The analysis engine 206 performs both backend processing of aggregated trip data to derive the height parameters and characteristics to maintain the parameter database and runtime processing to determine optimal routes and service providers in response to a request (e.g., routing or service request). To enable these operations, the analysis engine 206 comprises an altitude module 302, a pressure module 304, a heading module 306, a level module 308, and an edge module 310 all configured to communicate with each other (e.g., via a bus, shared memory, or a switch). The analysis engine 206 may also comprise other components (not shown) that are not pertinent to example embodiments.

The altitude module 302 is configured to determine an altitude associated with a point of interest along a segment of roadway. Different levels of roadway that are stacked (e.g., overlap each other) can be distinguished by different altitudes associated with the different levels. During backend processing, the altitude module 302 detects altitudes of the user devices 106 (traveling in a vehicle) using GPS trace data and altitude readings detected by a sensor of each user device accessed from the stored trip data. For example, trip data may include an altitude reading during a pick-up of a rider. The altitude reading is parsed from the trip data to identify the altitude at the pick-up location and is associated with the pick-up location at the point of interest. As such, the height parameter (e.g., altitude) of the pick-up location can provide an indication of a particular level associated with pick-ups for the point of interest. Conversely, altitude can be parsed from the trip data to identify an altitude at a drop off location and be associated with the drop off location. For instance, at an airport, the pick-up location may be at a bottom or lower level of the airport (e.g., the arrivals level) that is associated with an altitude that is below that of a departure level located on a higher level where riders are typically dropped off. The altitude is associated with the point of interest, and more specifically, a level of the point of interest (e.g., pick-up location or drop off location at the airport) and stored to the data storage 212 for use during runtime.

During runtime, the altitude module 302 uses accesses location data (e.g., GPS data) for a location (e.g., current location, pick-up location) associated with a user device of a user and an altitude reading from the user device. The altitude module 302 then determines the altitude for the location from the altitude reading. In example embodiments, the altitude is provided to the routing engine 208 for further analysis. The user can be a requester requesting a transportation service (e.g., delivery of a person or item to a destination) or a service provider providing the transportation service.

In example embodiments, the pressure module 304 uses pressure readings recorded in the trip data to determine a level of roadway for a point of interest during backend processing. In these embodiments, a pressure sensor at the user device 106 detects a pressure reading and provides the pressure reading as part of the trip data to the networked system 102. In one embodiment, the pressure is barometric pressure. As elevation increases, the pressure decreases. Therefore, different levels of roadway that are stacked (e.g., overlap each other) can be distinguished by different pressure readings. The pressure module 304 parses the pressure reading from the trip data. A corresponding elevation (e.g., altitude) can be derived from the pressure reading (e.g., from a lookup table). For instance, a pick-up location at an arrivals level of the airport will have a different pressure reading than a drop off location at a departure level of the airport. The pressure reading or derived elevation is associated with the point of interest (e.g., a level of the point of interest) and stored to the data storage 212 for use during runtime. In some cases, an extended Kalman filter is used to determine the altitude or pressure based on analysis of a plurality of trips from the trip data.

During runtime, the pressure module 304 accesses location data (e.g., GPS data) for a location (e.g., current location, pick-up location) associated with a user device of a user and a pressure reading from the user device. The pressure module 304 then determines the pressure or corresponding elevation for the location from the pressure reading. In example embodiments, the derived pressure or corresponding elevation is provided to the routing engine 208 for use in further analysis.

The heading module 306 identifies a direction that a vehicle travels when traversing stacked roadways. In example embodiments, the networked system 102 monitors the user devices 106 as they travel along a route. Thus, heading information (e.g., compass direction) is stored as part of the trip data. The heading module 306 detects the heading information as the user device 106 (within the vehicle) approaches a pick-up location or a drop off location. The heading module 306 may also detect a side of the street or roadway that the vehicle carrying the user device 106 stops at when picking up or dropping off. Further still, heading is detected for complex roads such as cloverleaf roads or roads that are one ways in opposite directions next to each other. In some embodiments, the heading module 306 associates the heading with the height parameter (e.g., altitude, level) determined by other components of the analysis engine 206 for the same level at a point of interest. The heading along with the association is stored to the data storage 212 for use during runtime.

During runtime, the heading module 306 can monitor a heading of the vehicle as it traverses a route or detect a heading the vehicle will travel while traversing a generated route. In example embodiments, the heading is provided to the routing engine 208 for use in further analysis.

The level module 308 identifies Z-levels associated with points of interest. The Z-level is defined by an integer that indicates a position relative to a ground level of the road. As such, Z=0 at ground level, 1 for one above ground level, and so forth. In some embodiments, the Z-level is provided by the user. For example, a user may specify that they want to be picked up at arrivals at the airport. The networked system 102 may request that the user verify what floor the arrival level is on. The user's response is recorded as part of the trip data. Subsequently, the level module 308 parses the Z-level data from the trip data and associates the Z-level with the point of interest (e.g., the arrival level at the airport), and stores this information to the data storage 212 for use during runtime.

The edge module 310 detects an edge geometry for a segment of roadway. As noted above, the networked system 102 monitors the user device 106 (and the vehicle the user device 106 is traveling in) and stores the information as part of the trip data. Thus, the trip data includes a route traversed by the user which indicates what each segment of roadway looks like. By using curves in roads along with known information about the level of the roads (from other derive height parameters), a top road can be distinguished from a bottom road (e.g., cloverleaf roadways that overlap). In some embodiments, the user provides an indication of the level of the road to the networked system 102. For example, when the user indicates a pick-up location, the networked system 102, via a user interface generated by the UI module 210, may request the user indicate what level they are located. The edge module 310 can then associate the edge geometry at or near the pick-up location with the indicated level and store the information to the data storage 212 for use during runtime.

Figure 4:
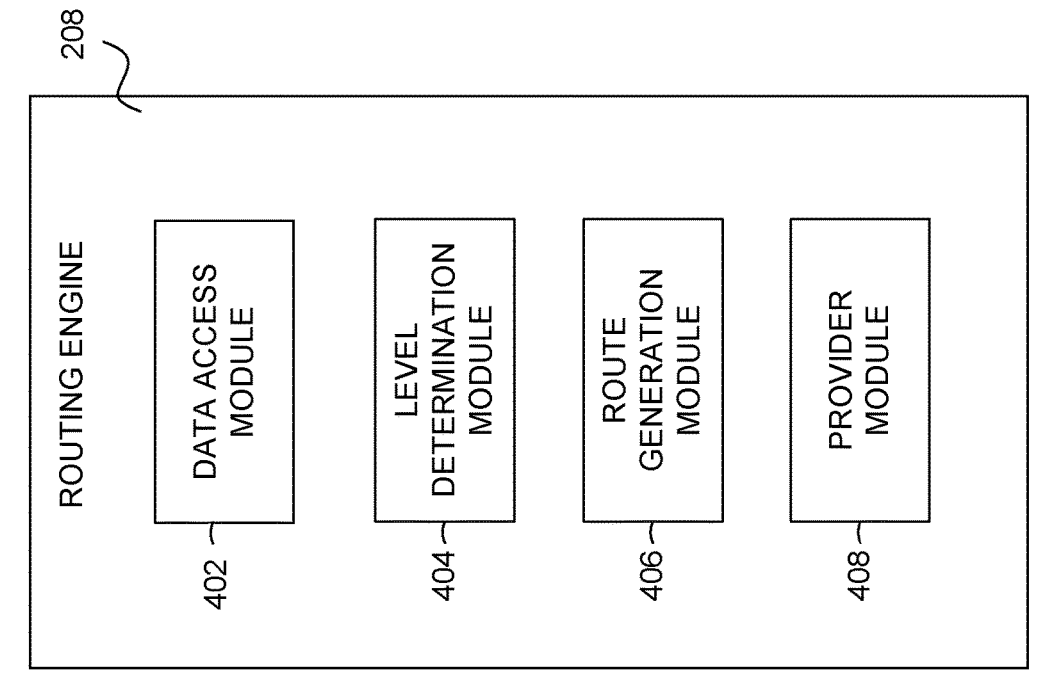
FIG. 4 is a block diagram illustrating components of a routing engine, according to some example embodiments.

FIG. 4 is a block diagram illustrating components of the routing engine 208, according to some example embodiments. The routing engine 208 manages generation and monitoring of routes to a pick-up location, between a pick-up location and a drop off location, as well as selection of service providers for a transportation service during runtime. Specifically, the routing engine 208 uses the height parameters and characteristics associated with the points of interest and/or a user's current location, during runtime, to determine one or more optimal routes or service providers for the transportation service. To enable these operations, the routing engine 208 comprises a data access module 402, a level determination module 404, a route generation module 406, and a provider module 408 all configured to communicate with each other (e.g., via a bus, shared memory, or a switch).

The data access module 402 accesses various data for the routing engine 208. In particular, the data access module 402 receives a request from a user device 106. In one embodiment, the request is for directions to a particular location. In another embodiment, the request is for a transportation service that includes picking up a person or item (e.g., food) and dropping off the person or item at a destination (also referred to as the drop off location). In response to receiving the request, the data access module 402 accesses the data storage 212. Using one or more points of interest indicated in the request, the data access module 402 finds the stored data corresponding to the one or more points of interest. The stored data is then provided to the other components of the routing engine 208 to determine routing and/or to select service providers.

The level determination module 404 determines a level of the roadway for the point of interest and/or at a current location of one or more service providers near the point of interest. In example embodiments, the point of interest or current location is a location that is known to have different levels of roadway (e.g., airport; shopping mall). In some cases, the user requesting the service at the point of interest may be asked by the level determination module 404, via a user interface provided by the UI module 210, which level they are on or asked to confirm that they are on a particular level.

In other cases, the level determination module 404 accesses, via the data access module 402, device data for a user device at the point of interest or a current location including location data (e.g., GPS data), an altitude reading, or a pressure reading. The level determination module 404 provides the device data to the analysis engine 206, which determines a height parameter and/or other characteristics identifiable from the device data. As discussed, the analysis engine 206 analyzes one or more of an altitude reading, pressure reading, or heading information to identify the height parameter or characteristic. The height parameter and any characteristics are provided back to the level determination module 404. The level determination module 404 takes the height parameter (and any characteristics) and compares it to the data accessed by the data access module 402 for the location/point of interest. A match (or closeness within a predetermine range of the stored height parameters) in the height parameter and/or characteristics will identify the level of the roadway at the location/point of interest.

Once the level of the roadway is identified, the route generation module 406 generates one or more routes taking into consideration the level. For instance, if the level determination module 404 determines that the user is at a lower level of the airport, the route generation module 406 generates a route starting at the user's location at the lower level instead of starting the route at an upper level which may have traffic traveling in an opposite direction.

In one embodiment, the route generation module 406 generates a three-dimensional geofence relative to a toll location detected along the route. The route generation module 406 also identifies a direction that a vehicle will traverse the route (e.g., from a pick-up location to a drop off location) and based on the direction of the vehicle, determines, via the level determination module 404, a level of the roadway. Based on the level, the route generation module 406 determines whether to apply a toll to a cost associated with the route based on the vehicle traversing the three-dimensional geofence.

The provider module 408 is configured to determine one or more service providers to provide a transportation service associated with the request. Potential service providers are typically located around the user. However, a first potential service provider that is closer in distance may actually take longer to reach the user than a second potential service provider because the first service provider is on a different level of roadway from the user or on a segment of roadway traveling in an opposite direction (requiring the driver to make a U-turn to reach the user). As such, the provider module 408 attempts to find a service provider that is a shortest distance to the user (e.g., indicated point of interest/pick-up location of the user), a shortest estimated time of arrival to reach the user, or a combination of both. In example embodiments, the data access module 402 receives location information including a detected attribute from devices of a plurality of potential service providers. Using the detected attribute from the devices of the plurality of potential service providers, the level determination module 404 in conjunction with the analysis engine 206 determines a level of roadway for each of the plurality of potential service providers based on a derived height parameter. In some cases, the route generation engine 406 generates a route from each potential service provider to the user using the determined levels of the roadway. Subsequently, the provider module 408 determine a service provider from the plurality of potential service provider that satisfies a predetermined threshold (e.g., shortest distance to the user at the indicated point of interest, shortest estimated time of arrival to user at the indicated point of interest, or a combination of both).

Figure 5:
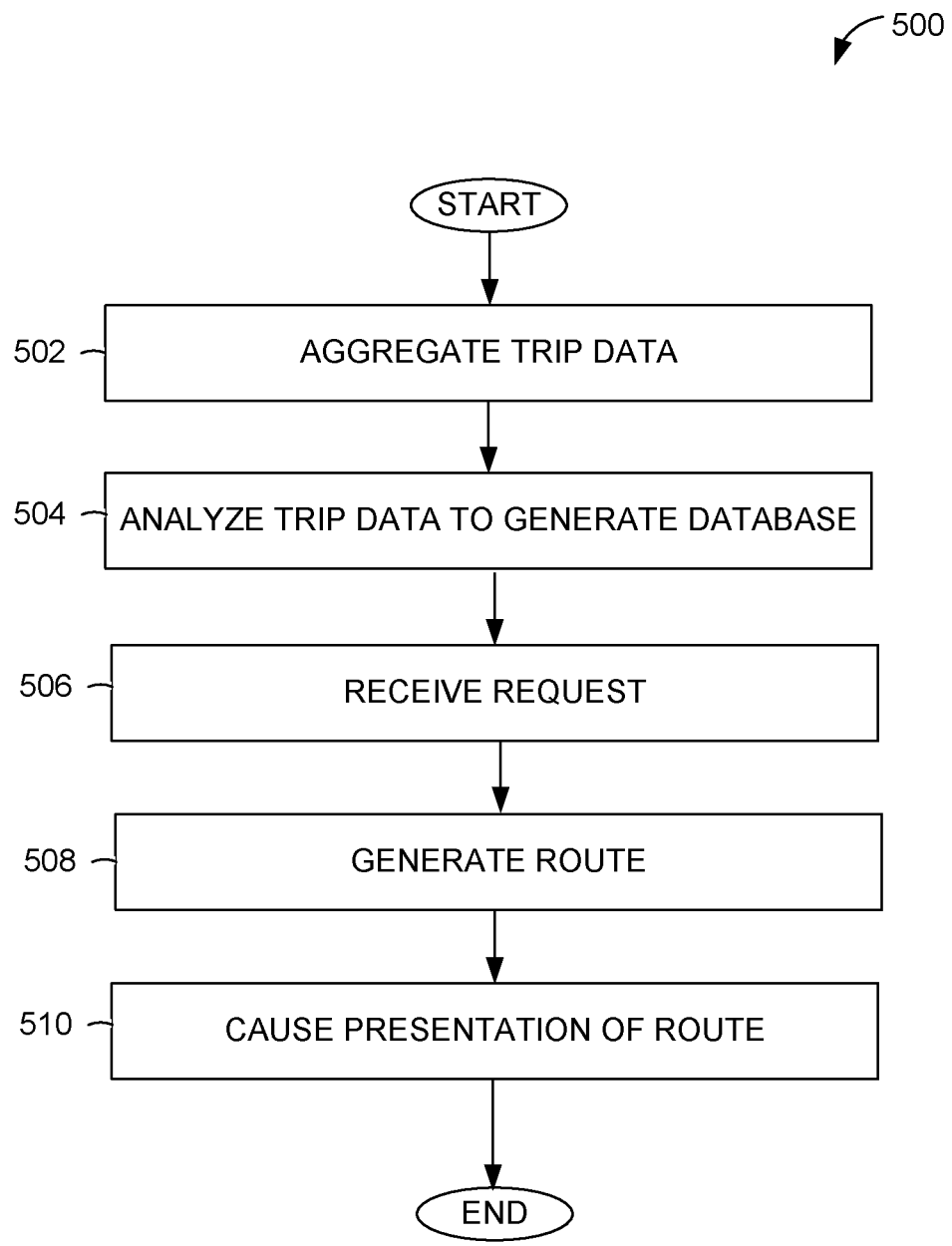
FIG. 5 is a flowchart illustrating operations of a method for optimizing a route based on height parameters of segments of roadway, according to some example embodiments.

FIG. 5 is a flowchart illustrating operations of a method 500 for optimizing a route based on height parameters associated with segments of roadway, according to some example embodiments. Operations in the method 500 may be performed by the networked system 102, using components described above with respect to FIG. 2 to FIG. 4. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In operation 502, the data aggregation module 204 aggregates trip data from a plurality of users. The trip data can include location information (e.g., latitude and longitude), indicated attributes (e.g., height parameters such as a level provided from a requester), and detected attributes (e.g., altitude reading, pressure reading, heading), time for each trip, and cost for the transportation service. The trip data is stored to the data storage 212 by the data aggregation module 204.

In operation 504, the analysis engine 206 analyzes the trip data to generate a database of height parameters and corresponding characteristics (e.g., heading, edge geometry) for points of interested and different levels at the point of interest. Operation 504 will be discussed in more detail in connection with FIG. 6 below.

In operation 506, the data access module 402 receives, via the device interface 202, a request. In one embodiment, the request is for directions to a particular location. In another embodiment, the request is for a transportation service that includes picking up a person or item (e.g., food) and dropping off the person or item at a destination (also referred to as the drop off location).

Based on the request, a route is generated in operation 508 by the routing engine 208. In example embodiments, the level determination module 404 determines a level of the roadway at the point of interest identified in the request and/or a current location of a user. In some cases, the user requesting the service at the point of interest may be asked by the level determination module 404, via a user interface provided by the UI module 210, which level they are on or asked to confirm that they are on a particular level. In other cases, the level determination module 404 accesses device data for a user device at the point of interest (e.g., current location) including location data (e.g., GPS data), an altitude reading, or a pressure reading. The level determination module 404 provides the device data to the analysis engine 206, which determines a height parameter and/or other characteristics identifiable from the device data. The height parameter is provided back to the level determination module 404, which takes the height parameter and compares the height parameter for the location/point of interest to stored data accessed from the database. A match (or within a predetermine range of the stored height parameters) of the height parameter (and/or characteristics) will identify the level of the roadway at the location/point of interest. For example, if the point of interest is the airport, the level determination module 404 may determine that that the user is on an arrivals level which is on a bottom roadway that is overlapped by an upper roadway associated with a departure level.

Once the level of the roadway is identified, the route generation module 406 generates one or more routes taking into consideration the level. For instance, if the level determination module 404 determines that the user is at a lower level of the airport, the route generation module 406 generates a route starting at the user's location at the lower level instead of starting the route at an upper level which may have traffic traveling in an opposite direction.

In operation 510, the route is presented, via the device interface 202, on the device of the user. In some embodiments, the UI module 210 generates a user interface that displays the route and provide the user interface to the device interface 202. The device interface 202 causes the user interface with the route to be displayed on the user device 106 (e.g., transmits the user interface or instructions to generate and present the user interface).

In one example use case, the route is from a current location of a user that is requesting the route information to a vehicle (e.g., bicycle, scooter, car) in a multi-story structure (e.g., parking garage). Because the vehicle can be on a different level/floor than the user, example embodiments can leverage the operations of the networked system 102 to determine the level that both the user and the vehicle is on and generate a route accordingly. In example embodiments, the vehicle includes a component that provides sensor or location information to the networked system 102 (similar to the client application 108 at the user devices 106).

Figure 6:
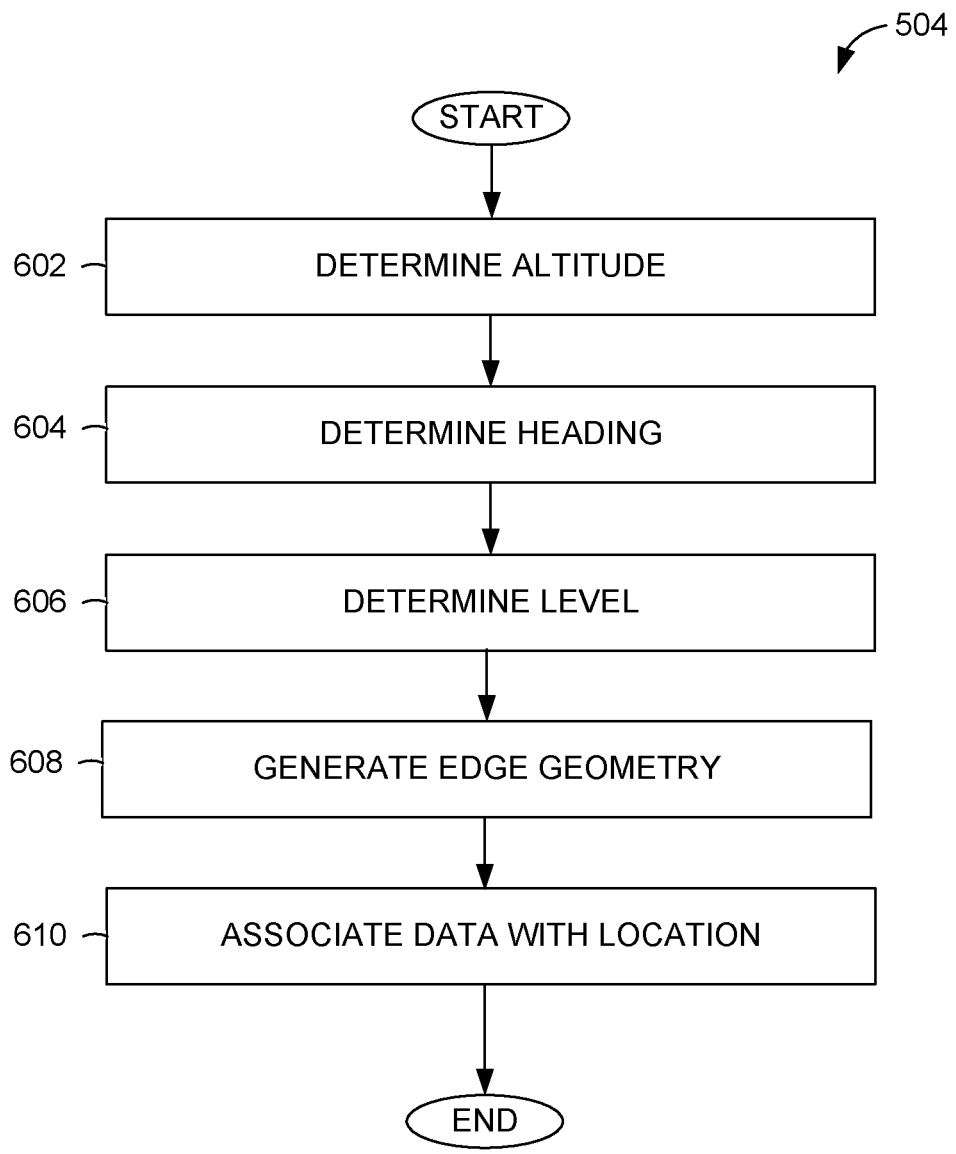
FIG. 6 is a flowchart illustrating operations of a method for analyzing trip data to maintain a parameter database, according to some example embodiments.

FIG. 6 is a flowchart illustrating operations of a method 600 for analyzing trip data to maintain a height parameter database, according to some example embodiments. Operations in the method 600 may be performed by the networked system 102, using components described above with respect to FIG. 2 and FIG. 3. Accordingly, the method 600 is described by way of example with reference to the networked system 102 and the analysis engine 206. However, it shall be appreciated that at least some of the operations of the method 600 may be deployed on various other hardware configurations or be performed by similar components residing elsewhere in the network environment 100. Therefore, the method 600 is not intended to be limited to the networked system 102.

In operation 602, the altitude module 302 determines altitude based on the trip data for a point of interest along a segment of roadway, thus distinguishing different levels of roadway that are stacked (e.g., overlap each other) based on different altitudes associated with the different levels. During backend processing, the altitude module 302 detects altitude of the user devices 106 (traveling in a vehicle) based on GPS trace data and altitude readings detected by a sensor of each user device accessed from the stored trip data. For example, trip data may include an altitude reading during a pick-up or drop off of a rider. The altitude reading is parsed from the trip data to identify the altitude at the point of interest and is associated with that point of interest. As such, the height parameter (e.g., altitude) of the pick-up location can provide an indication of a particular level associated with the point of interest. The altitude is associated with the point of interest in operation 610 and stored to the data storage 212 for use during runtime.

During runtime, the altitude module 302 accesses location data (e.g., GPS data) for a location (e.g., current location, pick-up location) associated with a user device of a user and an altitude reading from the user device in substantially real-time. The altitude module 302 then determines the altitude for the location from the altitude reading.

In some embodiments, the altitude (or height parameter) is determined using pressure readings. In these embodiments, the pressure module 304 uses pressure readings recorded in the trip data to determine a level of roadway for a point of interest during backend processing. Different levels of roadway that are stacked (e.g., overlap each other) can be distinguished by different pressure readings since pressure decreases as elevation increases. The pressure module 304 parses the pressure reading from the trip data and associates the pressure reading or derived elevation (e.g., derived from a database of known elevations based on pressure) corresponding to the point of interest from the trip data. During runtime, the pressure module 304 accesses location data (e.g., GPS data) for a location (e.g., current location, pick-up location) associated with a user device of a user and a pressure reading from the user device in substantially real-time. The pressure module 304 then determines the pressure or corresponding height parameter (e.g., altitude or elevation) for the location from the pressure reading. The pressure or corresponding height parameter is associated with the point of interest in operation 610 and stored to the data storage 212 for use during runtime.

In operation 604, the heading module 306 determines a heading or direction that a vehicle travels when traversing stacked roadways. In example embodiments, the networked system 102 monitors the user devices 106 as they travel along a route. Thus, heading information (e.g., compass direction) is stored as part of the trip data. The heading module 306 detects, from the trip data, the heading information as the user device 106 (within the vehicle) approaches a pick-up location or a drop off location at a point of interest. The heading module 306 may also detect a side of the street or roadway that the vehicle carrying the user device 106 stops at when picking up or dropping off. During runtime, the heading module 306 can monitor a heading of the vehicle as it traverses a route or detect a heading the vehicle will travel while traversing the route. In some embodiment, the heading module 306 associates the heading with the height parameter (e.g., altitude, level) determined by other components of the analysis engine 206 for the same point of interest in operation 610. The heading along with the association is stored to the data storage 212 for use during runtime.

In operation 606, the level module 308 determines a level (e.g., Z-level) associated with points of interest. The Z-level is defined by an integer that indicates a position relative to a ground level of the road (e.g., Z=0 at ground level, Z=1 for one level above ground level, Z=2 for two levels above ground level). In some embodiments, the Z-level is provided by the user. For example, the user may specify that they want to be picked up at an airport. In example embodiments, the networked system 102 requests that the user verify what floor the arrival level is on. The user's response is recorded as part of the trip data. Subsequently, the level module 308 parses the Z-level data from the trip data and associates the Z-level (e.g., the arrival level) with the point of interest (e.g., the airport) in operation 610, and stores this information to the data storage 212 for use during runtime.

In operation 608, the edge module 310 generates edge geometry for segments of roadway. In example embodiments, the stored trip data includes a route traversed by the user which indicates what each segment of roadway looks like. By using curves in roads along with known information about the level of the roads (from other derived height parameters), a top road can be distinguished from a bottom road. In some embodiments, the user may provide the level of the roadway to the networked system. For example, when the user indicates a pick-up location, the networked system 102, via a user interface generated by the UI module 210, may request the user indicate what level they are located. The edge module 310 can then associate the edge geometry at or near the pick-up location with the indicated level in operation 610 and store the information to the data storage 212 for use during runtime.

Figure 7:
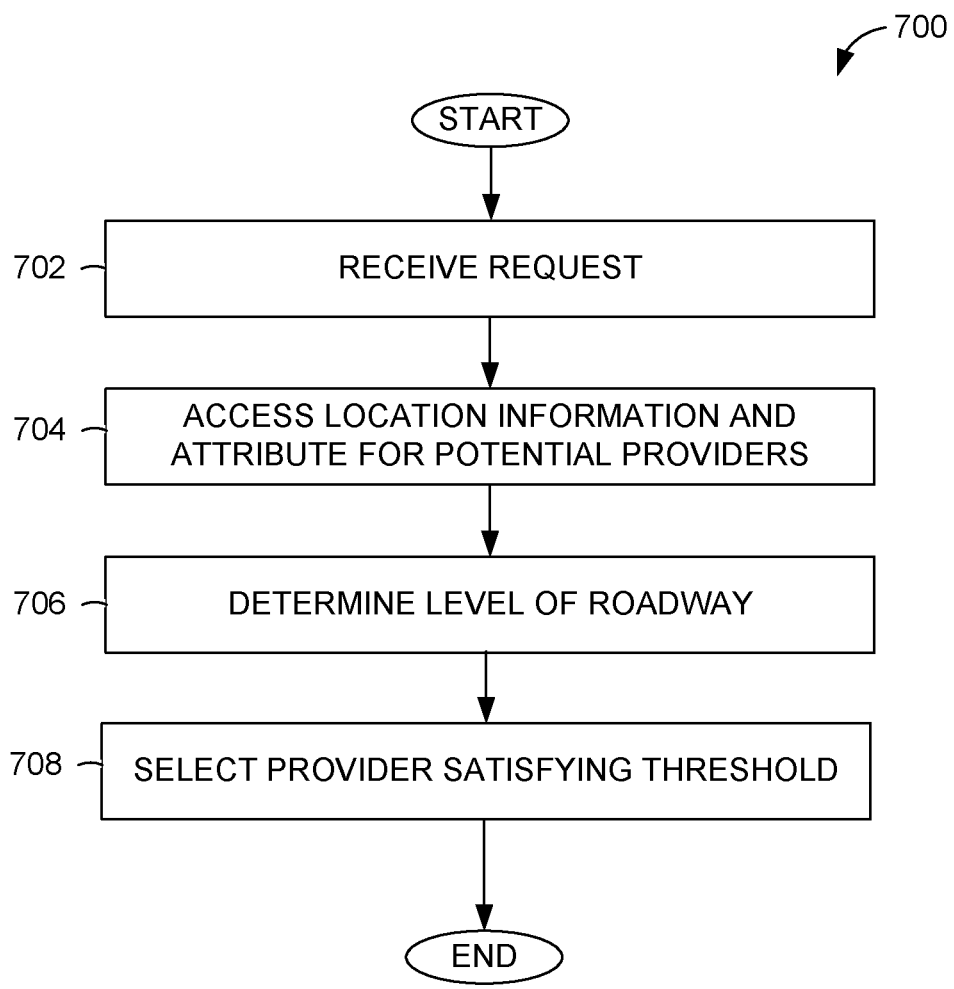
FIG. 7 is a flowchart illustrating operations of a method for determining a service provider for providing a transportation service.

FIG. 7 is a flowchart illustrating operations of a method 700 for determining a service provider for transportation service along the route. Operations in the method 700 may be performed by the networked system 102, using components described above with respect to FIG. 2 to FIG. 4. Accordingly, the method 700 is described by way of example with reference to the networked system 102. However, it shall be appreciated that at least some of the operations of the method 700 may be deployed on various other hardware configurations or be performed by similar components residing elsewhere in the network environment 100. Therefore, the method 700 is not intended to be limited to the networked system 102.

In operation 702, the data access module 402 receives, via the device interface 202, a request for transportation service that includes picking up a person or item (e.g., food) and dropping off the person or item at a destination (also referred to as the drop off location).

In operation 704, the data access module 402 accesses location information and at least one detected attribute for potential service provider. The location information comprises a current location of each potential service provider (e.g., via GPS) and the detected attribute can comprise, for example, an altitude reading, pressure reading, or heading. The location information and detected attribute may be accessed via the device interface 202 communicating with the client application 108 operating on the service provider device 106*b*.

In operation 706, a level of roadway each potential service provider is located on is determined. In example embodiments, using the detected attribute from the devices of the plurality of potential service providers, the level determination module 404 in conjunction with the analysis engine 206 determines a corresponding height parameter for each of the plurality of potential service providers, whereby the height parameter indicates a level of roadway each of the potential service providers are located.

In operation 708, the provider module 408 selects an optimal service provider from the plurality of potential service providers that satisfies a predetermined threshold. In some cases, the route generation engine 406 generates a route from each potential service provider to the user using the determined levels of the roadway that is then analyzed to detect potential service providers that satisfy the predetermined threshold. In example embodiments, the predetermined threshold is a shortest distance to the user, a shortest estimated time of arrival to the user, or a combination of both.

While example embodiments have discussed detecting a level at a point of interest, the point of interest can be continuously moving. As such a combination of stored level of roadway data from the parameter database, a detected current level of a vehicle, pressure data, or data from other sensors (e.g., accelerometer, gyroscope, magnetometer) can be used to perform continuous roadway map-matching estimations and real-time tracking of a driver of the vehicle.

Figure 8:
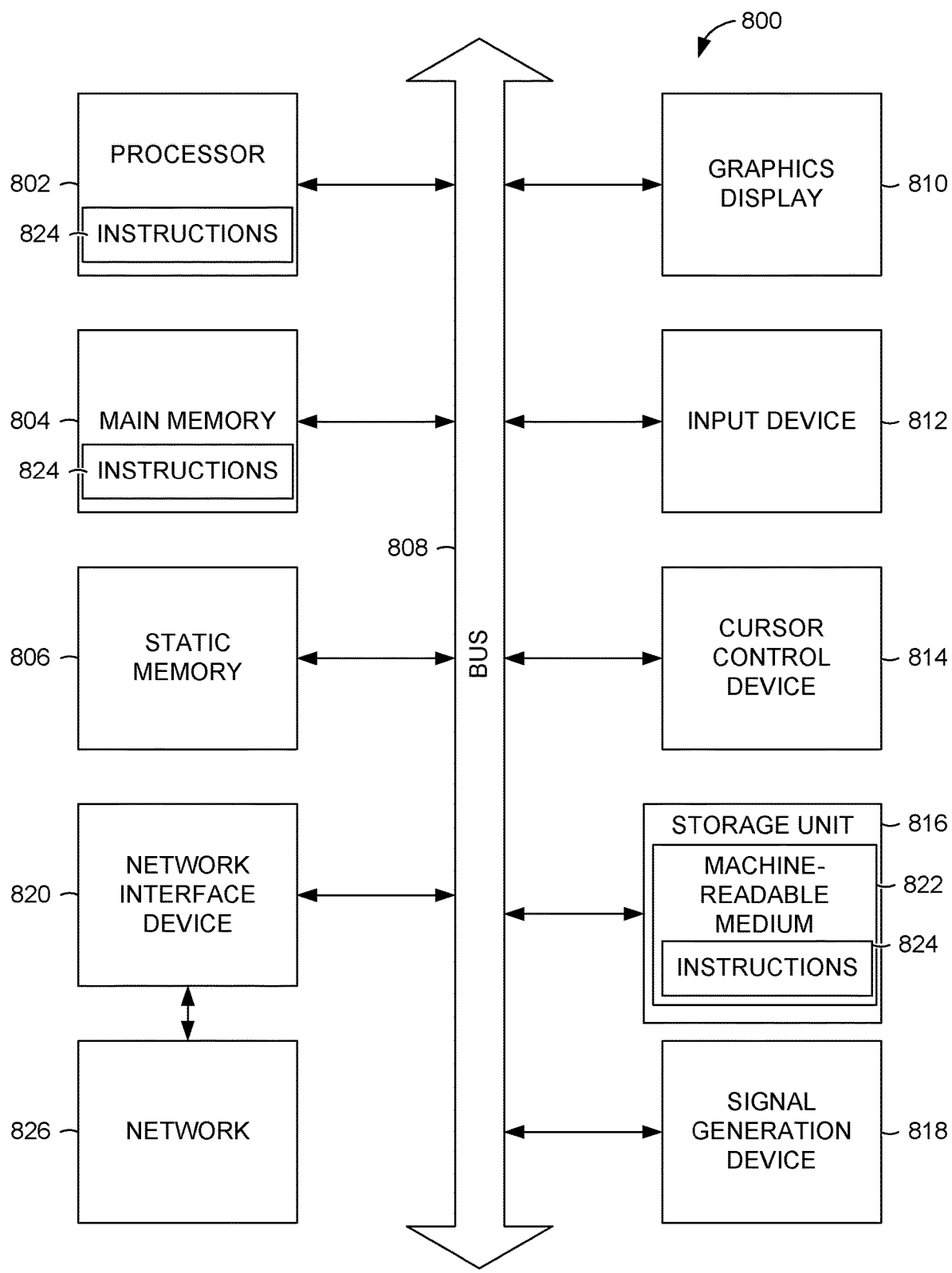
FIG. 8 is a block diagram illustrating components of a machine, according to some example embodiments, able to read instructions from a machine-readable medium and perform any one or more of the methodologies discussed herein.

FIG. 8 illustrates components of a machine 800, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIGS. 5-7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an alphanumeric input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-readable medium 822 (e.g., a tangible machine-readable storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-readable media (e.g., tangible and non-transitory machine-readable media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for managing routing involving a point of interest associated with a plurality of levels of a multilevel roadway. The method comprises receiving a request, at a networked system, the request including the point of interest; in response to receiving the request, detecting, using a hardware processor of the networked system, a level of the multilevel roadway at the point of interest; based on the detected level of the multilevel roadway at the point of interest, generating a route including the point of interest at the detected level; and causing presentation of the route on one or more user devices.

In example 2, the subject matter of example 1 can optionally include wherein the detecting the level of the multilevel roadway at the point of interest comprises causing presentation of a user interface on a user device that requests a user of the user device to indicate the level.

In example 3, the subject matter of examples 1-2 can optionally include wherein the detecting the level of the multilevel roadway at the point of interest comprises analyzing device data from the one or more user devices to derive a height parameter at the point of interest; accessing a database for a plurality of points of interest; comparing the derived height parameter to height parameters for different levels at the point of interest; and based on the comparing, identifying the level of the multilevel roadway.

In example 4, the subject matter of examples 1-3 can optionally include aggregating trip data received from user devices, the trip data including location information and an attribute detected for each point of interest; analyzing the location information and the detected attribute to determine a height parameter for each point of interest, the height parameter indicating a level of roadway for each point of interest; associating the height parameter with each corresponding point of interest; and storing the association to a database.

In example 5, the subject matter of examples 1-4 can optionally include wherein the attribute comprises an altitude reading for each point of interest; and the analyzing the location information and detected attribute comprises parsing the altitude reading to identify an altitude for each points of interest, the height parameter being the altitude.

In example 6, the subject matter of examples 1-5 can optionally include wherein the detected attribute comprises a pressure reading for each point of interest, the pressure reading being detected by pressure sensors at user devices providing the trip data; and the analyzing the location information and detected attribute comprises analyzing the pressure reading to determine a pressure or elevation for each points of interest, the height parameter being the elevation.

In example 7, the subject matter of examples 1-6 can optionally include wherein the detected attribute comprises a Z-level of a point of interest, the Z-level being a numeric indicator of a level in relative vertical relation to ground at the point of interest.

In example 8, the subject matter of examples 1-7 can optionally include aggregating trip data received from user devices, the trip data including location information and an attribute detected for each point of interest of a plurality of points of interest; using the location information and detected attribute to determine edge geometry of segments of roadways at the points of interest; associating the edge geometry for a particular point of interest with a height parameter for a level at the particular point of interest; and storing the association to a database.

In example 9, the subject matter of examples 1-8 can optionally include aggregating trip data received from user devices, the trip data including location information and a heading of each vehicle associated with the trip data; analyzing the location information and the heading to determine a direction associated with a particular point of interest; associating the heading with height parameter for a level at the particular point of interest; and storing the association to a database.

In example 10, the subject matter of examples 1-9 can optionally include generating a three-dimensional geofence relative to a toll location detected along the route; detecting a direction that a vehicle will traverse the route; based on the direction of the vehicle, determining a level based on a height parameter associated with a segment of roadway of the route; and based on the level, determining whether to apply a toll to a cost associated with the route.

In example 11, the subject matter of examples 1-10 can optionally include determining a service provider to provide a transportation service associated with the request, the determining comprising receiving location information including a detected attribute from devices of a plurality of potential service providers; using the location information and detected attribute from the devices of the plurality of potential service providers, determining a height parameter for each of the plurality of potential service providers, the height parameter indicating a level of roadway each of the potential service providers are located; and using the level of the roadway, selecting a service provider from the plurality of potential service provider that satisfies a predetermined threshold.

In example 12, the subject matter of examples 1-11 can optionally include wherein the predetermined threshold comprises a shortest distance to the indicated point of interest; a shortest estimated time of arrival at the indicated point of interest; or a combination of the shortest distance to the indicated point of interest and the shortest estimated time of arrival at the indicated point of interest, wherein the indicated point of interest is a pick-up location.

Example 13 is a system for managing routing involving a point of interest associated with a plurality of levels of a multilevel roadway. The system includes one or more processors and a storage device storing instructions that, when executed by the one or more hardware processors, causes the one or more hardware processors to perform operations comprising receiving a request including the point of interest; in response to receiving the request, detecting a level of the multilevel roadway at the point of interest; based on the detected level of the multilevel roadway at the point of interest, generating a route including the point of interest at the detected level; and causing presentation of the route on one or more user devices.

In example 14, the subject matter of example 13 can optionally include wherein the detecting the level of the multilevel roadway at the point of interest comprises analyzing device data from the one or more user devices to derive a height parameter at the point of interest; accessing a database for a plurality of points of interest; comparing the derived height parameter to height parameters for different levels at the point of interest; and based on the comparing, identifying the level of roadway.

In example 15, the subject matter of examples 13-14 can optionally include aggregating trip data received from user devices, the trip data including location information and an attribute detected for each point of interest; analyzing the location information and the detected attribute to determine a height parameter for each point of interest, the height parameter indicating a level of roadway for each point of interest; associating the height parameter with each corresponding point of interest; and storing the association to a database.

In example 16, the subject matter of examples 13-15 can optionally include aggregating trip data received from user devices, the trip data including location information and an attribute detected for each point of interest of a plurality of points of interest; using the location information and detected attribute to determine edge geometry of segments of roadways at the points of interest; associating the edge geometry for a particular point of interest with a height parameter for a level at the particular point of interest; and storing the association to a database.

In example 17, the subject matter of examples 13-16 can optionally include aggregating trip data received from user devices, the trip data including location information and a heading of each vehicle associated with the trip data; analyzing the location information and the heading to determine a direction associated with a particular point of interest; associating the heading with height parameter for a level at the particular point of interest; and storing the association to a database.

In example 18, the subject matter of examples 13-17 can optionally include determining a service provider to provide a transportation service associated with the request, the determining comprising receiving location information including a detected attribute from devices of a plurality of potential service providers; using the location information and detected attribute from the devices of the plurality of potential service providers, determining a height parameter associated with each of the plurality of potential service providers, the height parameter indicating a level of roadway each of the potential service providers are located; and using the level of the roadway, selecting a service provider from the plurality of potential service provider that satisfies a predetermined threshold.

In example 19, the subject matter of examples 13-18 can optionally include using a combination of at least stored level of roadway data from a database, a detected level of a vehicle, and pressure data to perform continuous roadway map-matching estimations and real-time tracking of a driver of the vehicle.

Example 20 is a machine-storage medium for managing routing involving a point of interest associated with a plurality of levels of a multilevel roadway. The machine-storage medium configures one or more processors to perform operations comprising receiving a request including the point of interest; in response to receiving the request, detecting a level of the multilevel roadway at the point of interest; based on the detected level of the multilevel roadway at the point of interest, generating a route including the point of interest at the detected level; and causing presentation of the route on one or more user devices.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
performing backend processing, the backend processing comprising:
  deriving height parameters by analyzing location information and detected attributes parsed from aggregated trip data;
  correlating the derived height parameters with different levels of multilevel roadways for a plurality of points of interest; and
  storing the correlated height parameters with different levels of the multilevel roadways for the plurality of points of interest in a height parameter database;
receiving, at a network system, a request from a computing device over a network, the request including a point of interest that includes a multilevel roadway;
in response to receiving the request, accessing device data from the computing device, the device data including a sensor reading from a sensor of the computing device at the point of interest;

analyzing the device data to derive a height parameter associated with the computing device;
using the height parameter and the height parameter database, identifying a level of the multilevel roadway at the point of interest where the computing device is located;
generating a route including the point of interest using the identified level of the multilevel roadway;
aggregating new trip data while monitoring the computing device as the computing device traverses the route; and
performing the backend processing to analyze the new trip data and update the height parameter database based on the analyzed new trip data.

2. The method of claim 1, further comprising causing presentation of a user interface on a user device that requests a user of the user device to confirm the level.

3. The method of claim 1, wherein the identifying the level of the multilevel roadway at the point of interest comprises:
accessing a database for a plurality of points of interest;
comparing the derived height parameter to height parameters for different levels at the point of interest; and
based on the comparing, identifying the level of the multilevel roadway.

4. The method of claim 1, further comprising:
aggregating trip data received from user devices, the trip data including the location information and an attribute detected for each point of interest.

5. The method of claim 4, wherein:
the attribute comprises an altitude reading for each point of interest; and
the deriving the height parameters comprises parsing the altitude reading to identify an altitude for each point of interest, the height parameter being the altitude.

6. The method of claim 4, wherein:
the attribute comprises a pressure reading for each point of interest, the pressure reading being detected by pressure sensors of user devices providing the trip data; and
the deriving the height parameters comprises analyzing the pressure reading to determine a pressure or elevation for each points of interest, the height parameter being the elevation.

7. The method of claim 4, wherein the attribute comprises a Z-level of a point of interest, the Z-level being a numeric indicator of a level in relative vertical relation to ground at the point of interest.

8. The method of claim 1, further comprising:
aggregating trip data received from user devices, the trip data including location information and an attribute detected for each point of interest of a plurality of points of interest;
using the location information and detected attribute to determine edge geometry of segments of roadways at each point of interest;
associating the edge geometry for a particular point of interest with a height parameter for a level at the particular point of interest; and
storing the association to the height parameter database.

9. The method of claim 1, further comprising:
aggregating trip data received from user devices, the trip data including location information and a heading of each vehicle associated with the trip data;
analyzing the location information and the heading to determine a direction associated with a particular point of interest;
associating the heading with a height parameter for a level at the particular point of interest; and
storing the association to the height parameter database.

10. The method of claim 1, further comprising
generating a three-dimensional geofence relative to a toll location detected along the route;
identifying a direction of a vehicle on the route;
based on the direction of the vehicle, determining a level based on a height parameter associated with a segment of roadway of the route; and
based on the level, determining whether to apply a toll to a cost associated with the route.

11. The method of claim 1, further comprising determining a service provider to provide a transportation service associated with the request, the determining comprising:
receiving location information including a detected attribute from devices of a plurality of potential service providers;
using the location information and detected attribute from the devices of the plurality of potential service providers, determining a height parameter associated with each of the plurality of potential service providers, the height parameter indicating a level of roadway each of the potential service providers are located; and
using the level of the roadway, selecting a service provider from the plurality of potential service provider that satisfies a predetermined threshold.

12. The method of claim 11, wherein the predetermined threshold comprises:
a shortest distance to the indicated point of interest;
a shortest estimated time of arrival at the indicated point of interest; or
a combination of the shortest distance to the indicated point of interest and the shortest estimated time of arrival at the indicated point of interest.

13. A system comprising:
one or more hardware processors; and
a storage device storing instructions that, when executed by the one or more hardware processors, cause the one or more hardware processors to perform operations comprising:
performing backend processing, the backend processing comprising:
deriving height parameters by analyzing location information and detected attributes parsed from aggregated trip data;
correlating the derived height parameters with different levels of multilevel roadways for a plurality of points of interest; and
storing the correlated height parameters with different levels of the multilevel roadways for the plurality of points of interest in a height parameter database
receiving a request including a point of interest that includes a multilevel roadway;
in response to receiving the request, accessing device data from the computing device, the device data including a sensor reading from a sensor of the computing device at the point of interest;
analyzing the device data to derive a height parameter associated with the computing device;
using the height parameter and the height parameter database, identifying a level of the multilevel roadway at the point of interest where the computing device is located;
generating a route including the point of interest using the identified level of the multilevel roadway;

aggregating new trip data while monitoring the computing device as the computing device traverses the route; and performing the backend processing to analyze the new trip data and update the height parameter database based on the analyzed new trip data.

14. The system of claim 13, wherein the identifying the level of the multilevel roadway at the point of interest comprises:

accessing a database for a plurality of points of interest;

comparing the derived height parameter to height parameters for different levels at the point of interest; and based on the comparing, identifying the level of the multilevel roadway.

15. The system of claim 13, wherein the operations further comprise:

aggregating trip data received from user devices, the trip data including the location information and an attribute detected for each point of interest.

16. The system of claim 13, wherein the operations further comprise:

aggregating trip data received from user devices, the trip data including location information and an attribute detected for each point of interest of a plurality of points of interest;

using the location information and detected attribute to determine edge geometry of segments of roadways at the points of interests;

associating the edge geometry for a particular point of interest with a height parameter for a level at the particular point of interest; and storing the association to the height parameter database.

17. The system of claim 13, wherein the operations further comprise:

aggregating trip data received from user devices, the trip data including location information and a heading of each vehicle associated with the trip data;

analyzing the location information and the heading to determine a direction associated with a particular point of interest;

associating the heading with height parameter for a level at the particular point of interest; and storing the association to the height parameter database.

18. The system of claim 13, wherein the operations further comprise determining a service provider to provide a transportation service associated with the request, the determining comprising:

receiving location information including a detected attribute from devices of a plurality of potential service providers;

using the location information and detected attribute from the devices of the plurality of potential service providers, determining a height parameter associated with each of the plurality of potential service providers, the height parameter indicating a level of roadway each of the potential service providers are located; and using the level of the roadway, selecting a service provider from the plurality of potential service provider that satisfies a predetermined threshold.

19. The system of claim 13, wherein the operations further comprise using a combination of at least a stored level of roadway data from a database, a detected level of a vehicle, and pressure data to perform continuous roadway map-matching estimations and real-time tracking of a driver of the vehicle.

20. A machine storage medium storing instructions that, when executed by one or more hardware processors of a machine, cause the machine to perform operations comprising:

performing backend processing, the backend processing comprising:

deriving height parameters by analyzing location information and detected attributes parsed from aggregated trip data;

correlating the derived height parameters with different levels of multilevel roadways for a plurality of points of interest; and storing the correlated height parameters with different levels of the multilevel roadways for the plurality of points of interest in a height parameter database;

receiving a request including a point of interest that includes a multilevel roadway;

in response to receiving the request, accessing device data from the computing device, the device data including a sensor reading from a sensor of the computing device at the point of interest;

analyzing the device data to derive a height parameter associated with the computing device;

using the height parameter and the height parameter database, identifying a level of the multilevel roadway at the indicated point of interest where the computing device is located;

generating a route including the indicated point of interest using the identified level of the multilevel roadway;

aggregating new trip data while monitoring the computing device as the computing device traverses the route; and performing the backend processing to analyze the new trip data and update the height parameter database based on the analyzed new trip data.

* * * * *

UNITED STATES PATENT AND TRADEMARK OFFICE
CERTIFICATE OF CORRECTION

| | |
|---|---|
| PATENT NO. | : 11,644,334 B2 |
| APPLICATION NO. | : 16/270040 |
| DATED | : May 9, 2023 |
| INVENTOR(S) | : Chopra et al. |

It is certified that error appears in the above-identified patent and that said Letters Patent is hereby corrected as shown below:

In the Claims

In Column 24, Line 4, in Claim 10, after "comprising", insert --:--

Signed and Sealed this
Fourth Day of July, 2023

Katherine Kelly Vidal
*Director of the United States Patent and Trademark Office*